United States Patent
Jemiolo et al.

(10) Patent No.: US 9,432,479 B2
(45) Date of Patent: *Aug. 30, 2016

(54) TAILORING CONTENT TO BE DELIVERED TO MOBILE DEVICE BASED UPON FEATURES OF MOBILE DEVICE

(75) Inventors: Daniel Jemiolo, Chapel Hill, NC (US); Todd E. Kaplinger, Raleigh, NC (US); Christopher C. Mitchell, Raleigh, NC (US); Gregory L. Truty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 659 days.

This patent is subject to a terminal disclaimer.

(21) Appl. No.: 13/405,311

(22) Filed: Feb. 26, 2012

(65) Prior Publication Data

US 2013/0031205 A1 Jan. 31, 2013

Related U.S. Application Data

(63) Continuation of application No. 13/193,810, filed on Jul. 29, 2011, now Pat. No. 9,131,013.

(51) Int. Cl.
*H04L 29/08* (2006.01)
*H04N 21/2662* (2011.01)
*H04N 21/258* (2011.01)
*H04N 21/414* (2011.01)
(Continued)

(52) U.S. Cl.
CPC ........ *H04L 67/34* (2013.01); *H04N 21/25825* (2013.01); *H04N 21/2662* (2013.01); *H04N 21/41407* (2013.01); *H04W 4/001* (2013.01); *H04W 4/18* (2013.01)

(58) Field of Classification Search
CPC ............ H04L 29/08072; H04L 29/06; H04L 29/08549
USPC ................ 709/213; 455/412.1–419; 370/335
See application file for complete search history.

(56) References Cited

U.S. PATENT DOCUMENTS

| 6,112,246 A | 8/2000 | Horbal et al. |
| 6,791,586 B2 | 9/2004 | Baker |
| 6,871,236 B2 * | 3/2005 | Fishman et al. ............. 709/246 |

(Continued)

OTHER PUBLICATIONS

Hyvarinen, Tuuli, "Browsing and Navigating Web Applications with Mobile Devices," University of Jyvaskyla, Master's Thesis in Information Systems Science, Dec. 14, 2004.

(Continued)

*Primary Examiner* — Razu A Miah
(74) *Attorney, Agent, or Firm* — Robert A. Voigt, Jr.; Winstead, P.C.

(57) ABSTRACT

A method for delivering tailored specific content to a mobile device. A shim application is provided to the mobile device by a content server after the mobile device visits the content server for the first time. The shim application detects the capabilities of the mobile device, such as the screen size, screen resolution, memory size, browser capabilities, etc. The shim application then includes such information in the header of the requests, such as a request for content, sent from the mobile device to the content server. The content server then generates the requested content in the appropriate format based on the information provided in the header. In this manner, the content server will now be able to ensure that the content provided by the content server for a particular mobile device will be appropriately displayed on the mobile device.

6 Claims, 4 Drawing Sheets

(51) Int. Cl.
*H04W 4/00* (2009.01)
*H04W 4/18* (2009.01)

(56) References Cited

U.S. PATENT DOCUMENTS

| | | | |
|---|---|---|---|
| 7,103,668 B1 | 9/2006 | Corley et al. | |
| 7,113,776 B2* | 9/2006 | Minear et al. | 455/419 |
| 7,222,306 B2 | 5/2007 | Kaasila et al. | |
| 7,284,061 B2 | 10/2007 | Matsubayashi et al. | |
| 7,603,106 B2* | 10/2009 | Aaltonen et al. | 455/412.1 |
| 7,734,663 B2 | 6/2010 | DeAnna et al. | |
| 7,853,593 B2 | 12/2010 | Serdy, Jr. et al. | |
| 7,908,315 B2* | 3/2011 | Parkinson | G06F 8/61 709/203 |
| 7,911,966 B2* | 3/2011 | Yoo et al. | 370/252 |
| 7,974,988 B2* | 7/2011 | Nandiwada et al. | 707/791 |
| 7,995,994 B2 | 8/2011 | Khetawat et al. | |
| 8,081,954 B2* | 12/2011 | Aaltonen et al. | 455/412.1 |
| 8,099,490 B2* | 1/2012 | Deakin | 709/224 |
| 8,213,333 B2* | 7/2012 | Greel et al. | 370/254 |
| 2003/0023427 A1 | 1/2003 | Cassin et al. | |
| 2003/0033377 A1 | 2/2003 | Chatterjee et al. | |
| 2003/0095135 A1 | 5/2003 | Kaasila et al. | |
| 2003/0140089 A1* | 7/2003 | Hines | H04L 29/06 709/202 |
| 2003/0210776 A1* | 11/2003 | Sollee | H04M 1/2535 379/218.01 |
| 2004/0016002 A1 | 1/2004 | Handelman et al. | |
| 2004/0024867 A1 | 2/2004 | Kjellberg | |
| 2004/0133657 A1 | 7/2004 | Smith et al. | |
| 2004/0143656 A1 | 7/2004 | Okada et al. | |
| 2004/0153712 A1 | 8/2004 | Owhadi et al. | |
| 2005/0078638 A1* | 4/2005 | Xue et al. | 370/335 |
| 2005/0091311 A1 | 4/2005 | Lund et al. | |
| 2005/0096016 A1 | 5/2005 | Tervo et al. | |
| 2005/0149564 A1 | 7/2005 | Jain et al. | |
| 2005/0154787 A1 | 7/2005 | Cochran et al. | |
| 2006/0067295 A1 | 3/2006 | Lehotsky et al. | |
| 2006/0165040 A1* | 7/2006 | Rathod et al. | 370/335 |
| 2006/0168101 A1 | 7/2006 | Mikhailov et al. | |
| 2006/0198359 A1 | 9/2006 | Fok et al. | |
| 2006/0274869 A1 | 12/2006 | Morse | |
| 2007/0183435 A1* | 8/2007 | Kettering et al. | 370/401 |
| 2008/0003991 A1 | 1/2008 | Sievers et al. | |
| 2008/0016533 A1 | 1/2008 | Rothschild | |
| 2008/0139112 A1 | 6/2008 | Sampath et al. | |
| 2008/0147592 A1* | 6/2008 | Nandiwada et al. | 707/1 |
| 2008/0192684 A1 | 8/2008 | Tervonen | |
| 2008/0222621 A1 | 9/2008 | Knight et al. | |
| 2008/0253311 A1 | 10/2008 | Jin | |
| 2008/0263139 A1* | 10/2008 | Martin | 709/203 |
| 2008/0298447 A1* | 12/2008 | Yoo et al. | 375/225 |
| 2009/0063267 A1 | 3/2009 | Dubinko et al. | |
| 2009/0149162 A1 | 6/2009 | Tenny | |
| 2009/0177770 A1* | 7/2009 | Jeong | G06F 21/10 709/224 |
| 2009/0213771 A1 | 8/2009 | Celentano et al. | |
| 2009/0233587 A1* | 9/2009 | Muhonen et al. | 455/414.1 |
| 2009/0265763 A1 | 10/2009 | Davies et al. | |
| 2009/0300685 A1* | 12/2009 | Easter | 725/62 |
| 2010/0121975 A1 | 5/2010 | Sinha et al. | |
| 2010/0153583 A1* | 6/2010 | Harris et al. | 709/246 |
| 2010/0174607 A1 | 7/2010 | Henkin et al. | |
| 2010/0191835 A1 | 7/2010 | Mehta et al. | |
| 2010/0223324 A1 | 9/2010 | Kawai | |
| 2010/0271992 A1 | 10/2010 | Wentink et al. | |
| 2010/0273462 A1 | 10/2010 | Thorn et al. | |
| 2010/0299338 A1 | 11/2010 | Aarni et al. | |
| 2011/0045847 A1* | 2/2011 | Roin et al. | 455/456.3 |
| 2011/0161409 A1* | 6/2011 | Nair | G06F 8/38 709/203 |
| 2011/0208822 A1 | 8/2011 | Rathod | |
| 2012/0158396 A1 | 6/2012 | Douceur et al. | |
| 2012/0206259 A1 | 8/2012 | Gassaway | |
| 2013/0031198 A1* | 1/2013 | Jemiolo et al. | 709/213 |
| 2013/0070655 A1 | 3/2013 | Nishida et al. | |

OTHER PUBLICATIONS

Fu et al., "A Framework for Device Capability on Demand and Virtual Device User Experience," IBM Journal Research and Development, vol. 48, No. 5/6, Sep./Nov. 2004, pp. 635-648.

Mahmoud et al., "Toward a Framework for the Discovery and Acquisition of Mobile Applications," ICMB-GMR 9th Inter. Conf. on Jun. 13-15, 2010, pp. 58-65.

Cheng et al., "A Novel Design of Behavioral Analysis Capability in Mobile SNS," ICCTA IEEE Inter. Conf. on Oct. 16-18, 2009, pp. 907-913.

Office Action for U.S. Appl. No. 13/193,810 dated Nov. 5, 2013, pp. 1-19.

Office Action for U.S. Appl. No. 13/193,810 dated Sep. 16, 2014, pp. 1-15.

Office Action for U.S. Appl. No. 13/193,810 dated May 22, 2014, pp. 1-15.

Office Action for U.S. Appl. No. 13/193,810 dated Mar. 11, 2015, pp. 1-14.

\* cited by examiner

TAILORING CONTENT TO BE DELIVERED TO MOBILE DEVICE BASED UPON FEATURES OF MOBILE DEVICE

CROSS-REFERENCE TO RELATED APPLICATIONS

The present application is a continuation application of pending U.S. patent application Ser. No. 13/193,810, which was filed on Jul. 29, 2011, which is assigned to the assignee of the present invention. The present application claims priority benefits to U.S. patent application Ser. No. 13/193,810.

TECHNICAL FIELD

The present invention relates to mobile communications, and more particularly to tailoring the content delivered to a mobile device based upon the features of the mobile device.

BACKGROUND

In the marketplace, there are currently numerous different types of mobile devices. Mobile devices include mobile or cellular phones, smart phones, personal digital assistants ("PDAs"), palmtop computers, laptop computers and the like. These mobile devices function as wireless communication devices via a wireless communication link (GSM, GRPS, 3G, CSMA and the like) and access content over a wireless network infrastructure.

Each of these mobile devices may include different variations and features, such as web browser(s), as part of their platform. As a result, there may be difficulty in delivering content in an appropriate format to a great number of these mobile devices due to their varying features, such as varying mobile web browsers. For example, the content may not be able to be rendered appropriately on some of these mobile devices since the content provider may not be transmitting content in a format compliant with their web browsers.

The World Wide Web Consortium ("W3C") has attempted to address this problem by adopting the Composite Capabilities/Preference Profile ("CC/PP"). The CC/PP is a specification for defining capabilities and preferences of user agents, where a user agent may refer to a client application implementing a network protocol used in communications within a client-server distributed computing system. With the CC/PP, a repository is created that maps the user agent to a set of features that are supported for that mobile device. However, the repository must be constantly updated in order to ensure that the mapping is up-to-date.

An additional attempt to address the difficulty in delivering content in an appropriate format to a great number of mobile devices with varying features is to have the mobile devices contain all of the possible libraries for the various mobile browser vendors thereby ensuring that the content is rendered on the mobile device appropriately. However, requiring the mobile devices to contain all of the possible libraries for the various mobile browser vendors is burdensome. Furthermore, the libraries would constantly need to be updated to ensure they are up-to-date.

Hence, there has not been an effective solution to delivering content in an appropriate format to a great number of mobile devices due to their varying features, such as varying mobile web browsers.

BRIEF SUMMARY

In one embodiment of the present invention, a method for delivering tailored specific content to a mobile device comprises providing a shim application to the mobile device, where the shim application detects capabilities of the mobile device. The method further comprises receiving a request for content, where the request comprises header information providing the capabilities of the mobile device. Additionally, the method comprises generating the content in a format compliant to the mobile device based on the header information. In addition, the method comprises transmitting, by a processor, the generated content to the mobile device.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

The present invention comprises a method, system and computer program product for delivering tailored specific content to a mobile device. In one embodiment of the present invention, a shim application is provided to the mobile device by a content server after the mobile device visits the content server for the first time. The shim application detects the capabilities of the mobile device, such as the screen size, screen resolution, memory size, browser capabilities, etc. The shim application then includes such information in the header of the requests, such as a request for content, sent from the mobile device to the content server. The content server then generates the requested content in the appropriate format based on the information provided in the header. In this manner, the content server will now be able to ensure that the content provided by the content server for a particular mobile device will be appropriately displayed on the mobile device.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
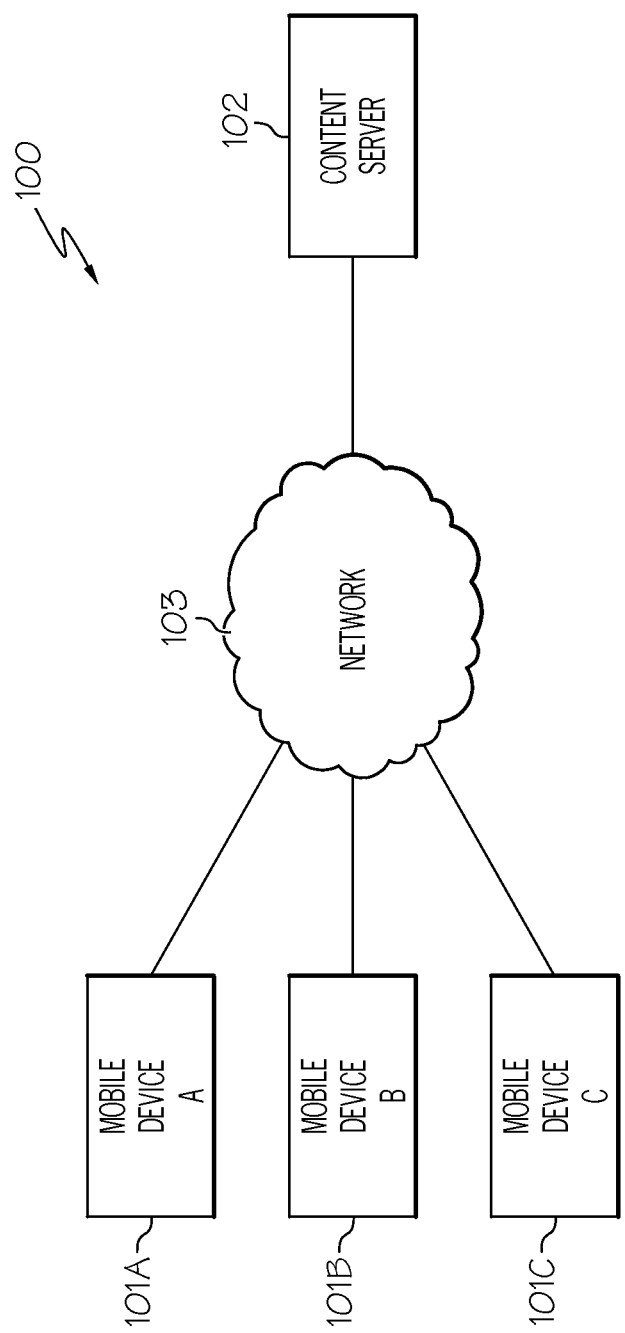
FIG. 1 illustrates an embodiment of the present invention of a network system.

Referring now to the Figures in detail, FIG. 1 illustrates a network system 100 configured in accordance with an embodiment of the present invention. Network system 100 includes mobile devices 101A-101C (identified as "Mobile Device A," "Mobile Device B," and "Mobile Device C," respectively, in FIG. 1). Mobile devices 101A-101C may collectively or individually be referred to as mobile devices 101 or mobile device 101, respectively. Mobile device 101 may be any mobile computing device, including, but not limited to, a mobile phone, a cellular phone, a smart-phone, a personal digital assistance (PDA), a gaming unit, a portable computing unit, tablet personal computer, and the like. System 100 may include any number of mobile devices 101 and the depiction of three mobile devices 101A-101C in FIG. 1 is for illustrative purposes. A description of one embodiment of the hardware configuration of mobile device 101 is provided below in connection with FIG. 2.

Mobile devices 101 are in wireless communication with a content server 102 via a network 103, which may be, for example, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Content server 102 is configured to receive and provide services and information to mobile devices 101. In particular, content server 102 is configured to receive a request for content from mobile device 101 and to ensure that the content is formatted in a format compliant for mobile device 101 based on header information provided by a shim application as discussed further below. A description of one embodiment of the hardware configuration of content server 102 is provided below in connection with FIG. 3.

While FIG. 1 illustrates a single content server 102, the principles of the present invention are not so constrained. For example, content may be served from a plurality of content servers, including a content server farm, a distributed server architecture, and the like, without departing from the scope and spirit of the described embodiments.

Figure 2:
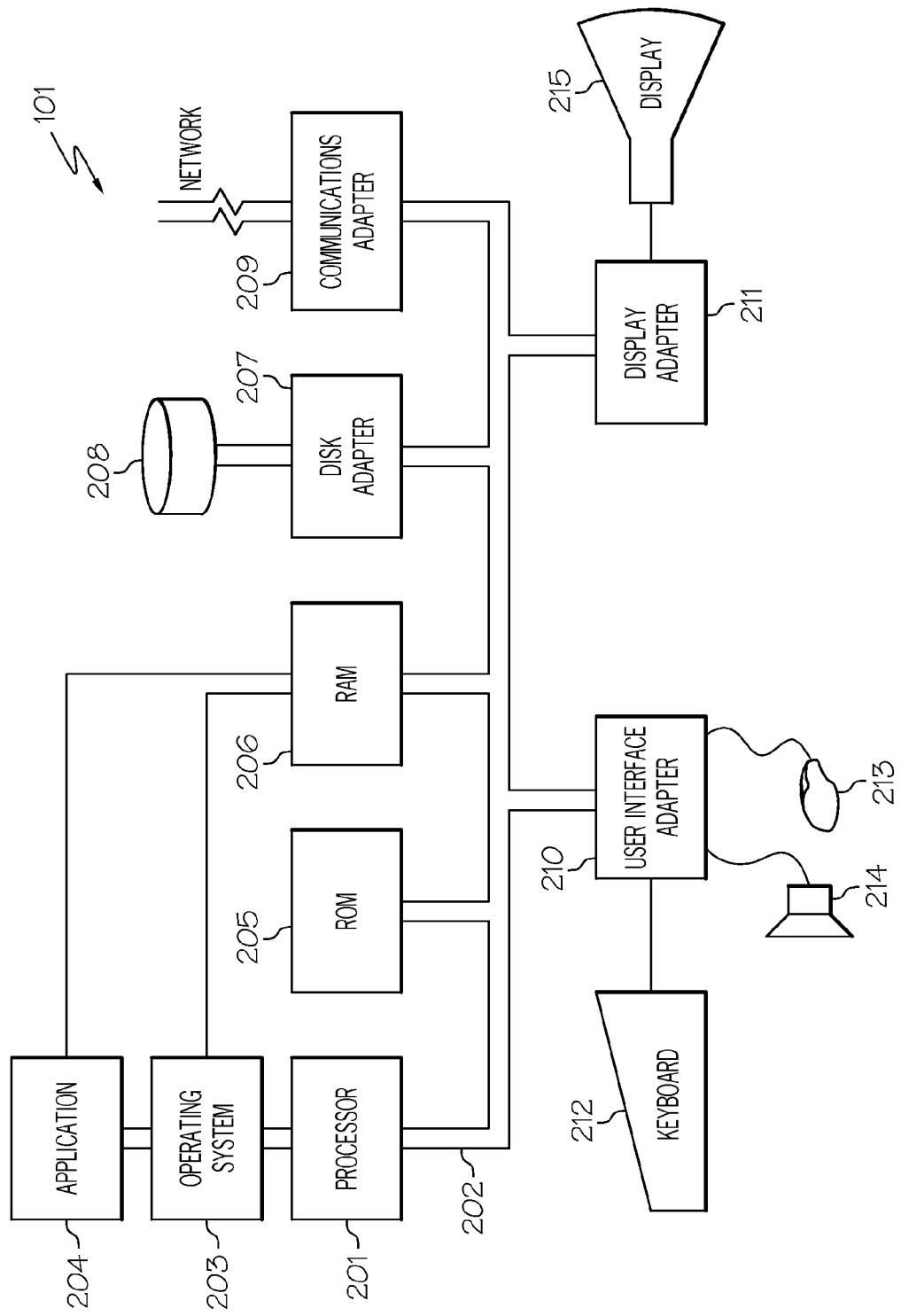
FIG. 2 illustrates a hardware configuration of a mobile device in accordance with an embodiment of the present invention.

Referring now to FIG. 2, FIG. 2 illustrates a hardware configuration of mobile device 101 which is representative of a hardware environment for practicing the present invention. Referring to FIG. 2, mobile device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a browser, an application shim provided by content server 102 (FIG. 2) used to detect the capabilities (e.g., screen size, screen resolution, memory size, browser capabilities) of mobile device 101, as discussed further below in association with FIG. 4.

Referring again to FIG. 2, read-only memory ("ROM") 205 is coupled to system bus 202 and includes a basic input/output system ("BIOS") that controls certain basic functions of mobile device 101. Random access memory ("RAM") 206 and disk adapter 207 are also coupled to system bus 202. It should be noted that software components including operating system 203 and application 204 may be loaded into RAM 206, which may be mobile device's 101 main memory for execution. Disk adapter 207 may be an integrated drive electronics ("IDE") adapter that communicates with a disk unit 208, e.g., disk drive.

Mobile device 101 may further include a communications adapter 209 coupled to bus 202. Communications adapter 209 interconnects bus 202 with an outside network (network 103) thereby enabling mobile device 101 to communicate with content server 102.

I/O devices may also be connected to mobile device 101 via a user interface adapter 210 and a display adapter 211. Keyboard 212, mouse 213 and speaker 214 may all be interconnected to bus 202 through user interface adapter 210. Data may be inputted to mobile device 101 through any of these devices. A display monitor 215 may be connected to system bus 202 by display adapter 211. In this manner, a user is capable of inputting to mobile device 101 through keyboard 212 or mouse 213 and receiving output from mobile device 101 via display 215 or speaker 214.

Figure 3:
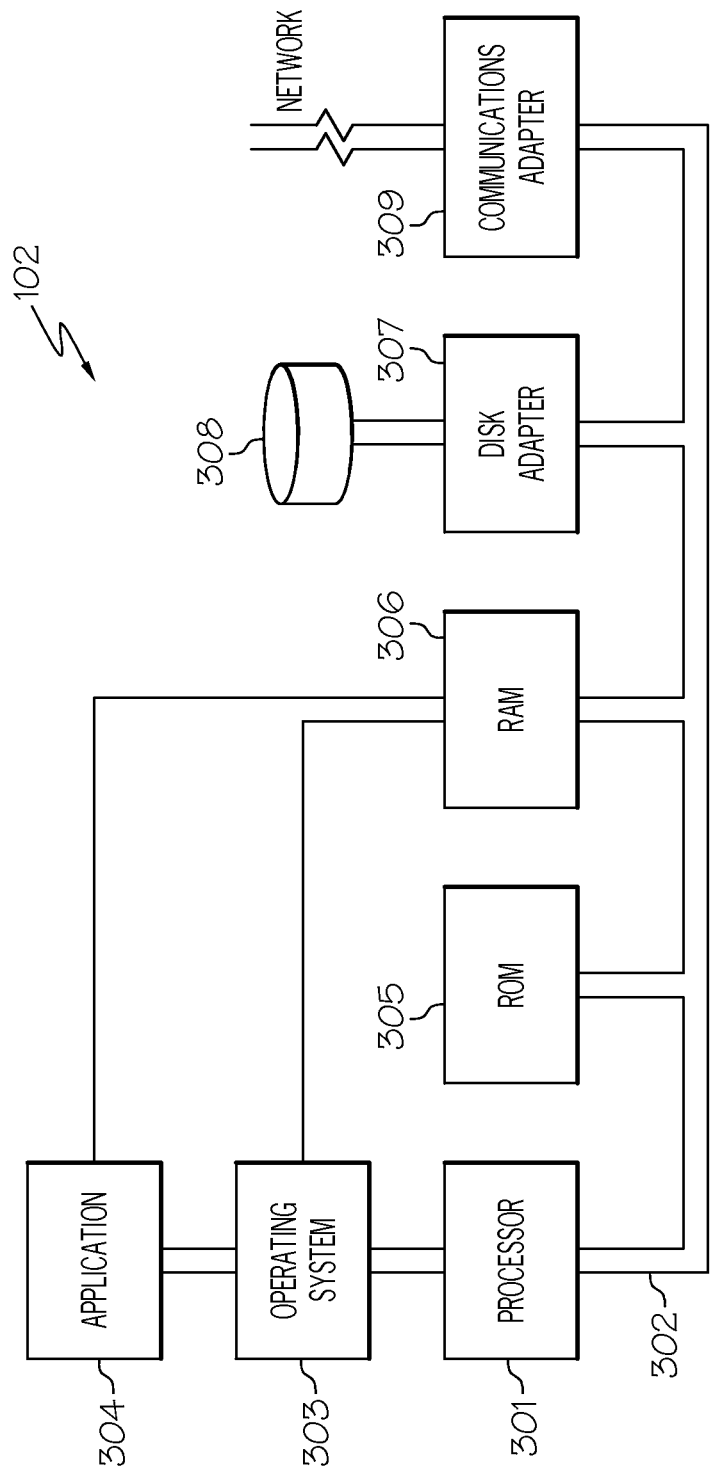
FIG. 3 illustrates a hardware configuration of a content server in accordance with an embodiment of the present invention.

As stated above, FIG. 3 illustrates a hardware configuration of a content server 102 (FIG. 1) which is representative of a hardware environment for practicing the present invention. Referring to FIG. 3, content server 102 has a processor 301 coupled to various other components by system bus 302. An operating system 303 runs on processor 301 and provides control and coordinates the functions of the various components of FIG. 3. An application 304 in accordance with the principles of the present invention runs in conjunction with operating system 303 and provides calls to operating system 303 where the calls implement the various functions or services to be performed by application 304. Application 304 may include, for example, a program for delivering tailored specific content to mobile device 101, as discussed further below in association with FIG. 4.

Referring again to FIG. 3, read-only memory ("ROM") 305 is coupled to system bus 302 and includes a basic input/output system ("BIOS") that controls certain basic functions of content server 102. Random access memory ("RAM") 306 and disk adapter 307 are also coupled to system bus 302. It should be noted that software components including operating system 303 and application 304 may be loaded into RAM 306, which may be content server's 102 main memory for execution. Disk adapter 307 may be an integrated drive electronics ("IDE") adapter that communicates with a disk unit 308, e.g., disk drive. It is noted that the program for delivering tailored specific content to mobile device 101, as discussed further below in association with FIG. 4, may reside in disk unit 308 or in application 304.

Content server 102 may further include a communications adapter 309 coupled to bus 302. Communications adapter 309 interconnects bus 302 with an outside network (network 103) thereby allowing content server 102 to communicate with mobile devices 101.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, mobile devices may include different variations and features, such as web browser(s), as part of their platform. As a result, there may be difficulty in delivering content in an appropriate format to a great number of these mobile devices due to their varying features, such as varying mobile web browsers. For example, the content may not be able to be rendered appropriately on some of these mobile devices since the content provider may not be transmitting content in a format compliant with their web browsers. Currently, there has not been an effective solution to delivering content in an appropriate format to a great number of mobile devices due to their varying features, such as varying mobile web browsers.

Figure 4:
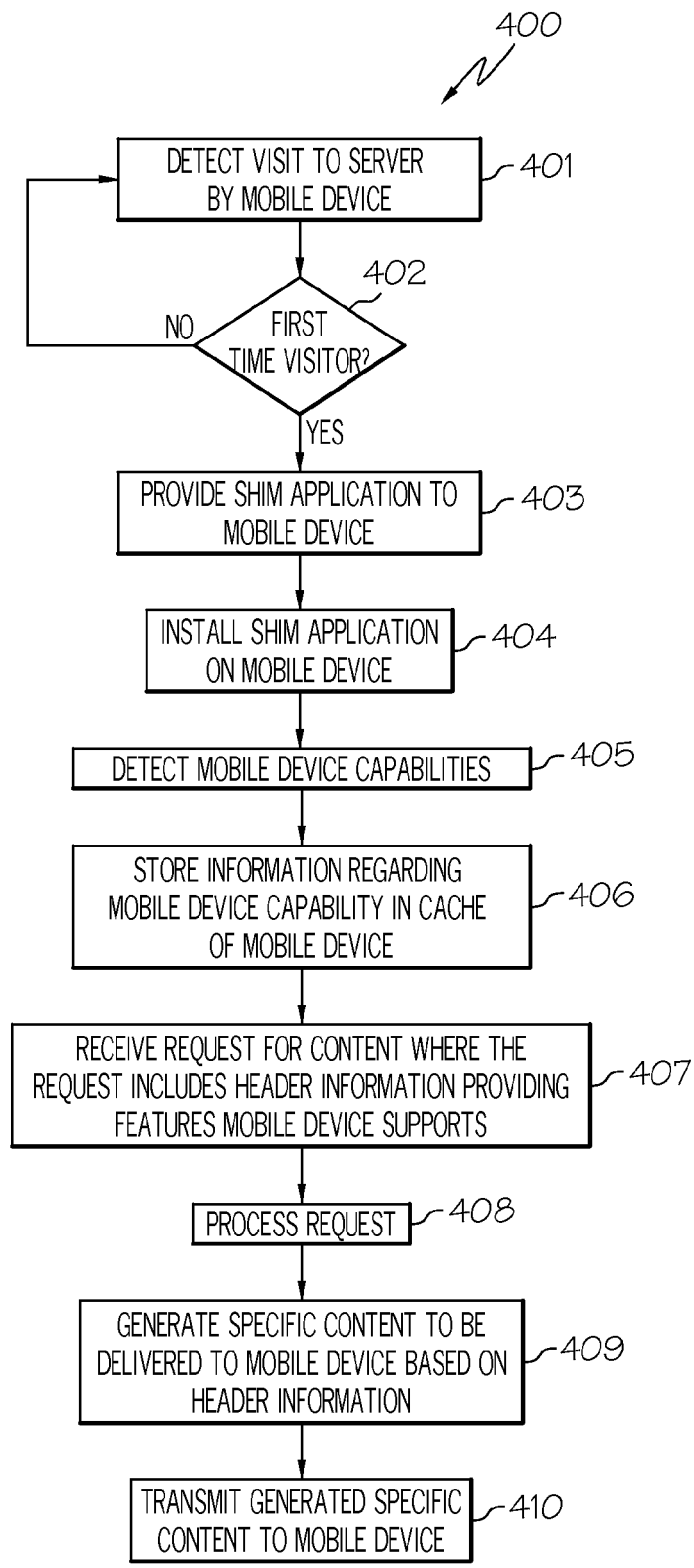
FIG. 4 is a flowchart of a method for delivering tailored specific content to a mobile device in accordance with an embodiment of the present invention.

The principles of the present invention provide an improved technique for delivering content in an appropriate format to various mobile devices with varying platforms by having the content server deliver specifically tailored content to each mobile device as discussed below in connection with FIG. 4. FIG. 4 is a flowchart of a method for delivering tailored specific content to a mobile device.

As stated above, FIG. 4 is flowchart of a method for delivering tailored specific content to a mobile device 101 (FIGS. 1 and 2) in accordance with an embodiment of the present invention.

Referring to FIG. 4, in conjunction with FIGS. 1-3, in step 401, content server 102 detects a visit to server 102 by mobile device 101.

In step 402, a determination is made by server 102 as to whether the visit by mobile device 101 is a first time visit. If the visit is not a first time visit, then content sever 102 continues to monitor a visit by a subsequent mobile device 101 in step 401.

If, however, content server 102 detects a first time visit by mobile device 101, then, in step 403, content server 102 provides a shim application to mobile device 101. A shim application refers to a small library which transparently intercepts an application programming interface of mobile device 101, changes the parameters passed, handles the operation itself or redirects the operation elsewhere. "Providing the shim application," as used herein, includes any means for the shim application to be provided to mobile device 101, including having content server 102 directly transmit the shim application to mobile device 101 as well as having content server 102 transmit a link to a website to download the shim application. In one embodiment, the shim application will be specific to mobile device 101 and will act as a client side proxy application. In one embodiment, the shim application will be configured as part of the installation.

In step 404, the user of mobile device 101 installs the shim application on mobile device 101. Once installed, in step 405, the shim application will detect the capabilities of mobile device 101. For example, the shim application can detect one or more of the following capabilities: screen size, screen resolution, memory size, browser capabilities, and the like. This list is not intended to be limiting but to provide examples of information that may be used to determine the capabilities of mobile device 101 so that content server 102 appropriately formats the content to be appropriately displayed on mobile device 101. Embodiments of the present invention cover any such information regarding the capabilities of mobile device 101 that may be used by content server 102 to appropriately format the content to be appropriately displayed on mobile device 101.

In step 406, the information regarding the capabilities of mobile device 101 detected by the shim application is stored in a cache (not shown in FIG. 2) of mobile device 101. The cache may be located internal within processor 201 or located external to processor 201. The cache may be any type of cache (e.g., physically indexed, physically tagged; virtually indexed, virtually tagged; virtually indexed, physically tagged).

In step 407, content server 102 receives a request for content from mobile device 101, where the request includes header information that provides content server 102 with the features or capabilities mobile device 101 supports, such as the capabilities detected in step 405. In one embodiment, the shim application adds the header information to the beginning of the data (i.e., request) being transmitted to content server 102, where the header information is obtained from the cache of mobile device 101.

In step 408, content server 102 processes the request. In step 409, content server 102 generates specific content to be delivered to mobile device 101 based on the received header information thereby ensuring that the content is formatted in a manner so that it will be appropriately displayed on mobile device 101. By content server 102 receiving information regarding the capabilities of mobile device 101 via the header information, content server 102 will now be able to ensure that the content provided by content server 102 for a particular mobile device 101 will be appropriately displayed on mobile device 101.

In step 410, content server 102 transmits the content generated in step 409 to mobile device 101.

In some implementations, method 400 may include other and/or additional steps that, for clarity, are not depicted. Further, in some implementations, method 400 may be executed in a different order presented and that the order presented in the discussion of FIG. 4 is illustrative. Additionally, in some implementations, certain steps in method 400 may be executed in a substantially simultaneous manner or may be omitted.

An example of a program using the principles of the present invention includes a program for generating charts and gauges which can be generated either on the client-side or on the server-side. The determination as to whether the program generates the charts and gauges on either the client-side or on the server-side can be determined based on the memory capabilities of mobile device 101, which is obtained from the shim application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for delivering tailored specific content to a mobile device, the method comprising:
   providing a shim application to said mobile device, wherein said shim application detects capabilities of said mobile device;
   receiving a request for content, wherein said request comprises header information providing said capabilities of said mobile device;
   generating said content in a format compliant to said mobile device based on said header information; and
   transmitting, by a processor, said generated content to said mobile device.

2. The method as recited in claim 1, wherein said capabilities comprise browser capabilities.

3. The method as recited in claim 1, wherein said capabilities comprise one or more of the following: screen size, screen resolution and memory size.

4. The method as recited in claim 1 further comprising:
   detecting a first time visit by said mobile device, wherein said shim application is provided to said mobile device in response to detecting said first time visit by said mobile device.

5. The method as recited in claim 1, wherein said capabilities detected by said shim application are stored in a cache of said mobile device.

6. The method as recited in claim 1, wherein said shim application is provided to said mobile device by transmitting a link to a website to download said shim application.

* * * * *